(12) United States Patent
Yu et al.

(10) Patent No.: US 9,143,300 B2
(45) Date of Patent: Sep. 22, 2015

(54) APPARATUS AND METHOD FOR TRANSMITTING/RECEIVING DATA IN COMMUNICATION SYSTEM

(71) Applicant: Electronics and Telecommunications Research Institute, Daejeon (KR)

(72) Inventors: Hee-Jung Yu, Daejeon (KR); Sok-Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 13/652,410

(22) Filed: Oct. 15, 2012

(65) Prior Publication Data

US 2013/0142115 A1    Jun. 6, 2013

(30) Foreign Application Priority Data

Oct. 13, 2011    (KR) .................. 10-2011-0104869
Nov. 28, 2011    (KR) .................. 10-2011-0125315
Oct. 12, 2012    (KR) .................. 10-2012-0113418

(51) Int. Cl.
| | |
|---|---|
| H04W 4/00 | (2009.01) |
| H04L 5/00 | (2006.01) |
| H04W 56/00 | (2009.01) |
| H04B 7/26 | (2006.01) |
| H04L 27/26 | (2006.01) |

(52) U.S. Cl.
CPC ............ *H04L 5/0053* (2013.01); *H04L 5/0092* (2013.01); *H04W 56/00* (2013.01); *H04B 7/2656* (2013.01); *H04L 5/0048* (2013.01); *H04L 27/2613* (2013.01)

(58) Field of Classification Search
USPC .......................................... 370/338, 389, 334
See application file for complete search history.

(56) References Cited

U.S. PATENT DOCUMENTS

| | | | |
|---|---|---|---|
| 2001/0028650 A1* | 10/2001 | Yoshizawa et al. ........... 370/389 |
| 2007/0230403 A1* | 10/2007 | Douglas et al. ............... 370/334 |
| 2008/0160951 A1* | 7/2008 | Dominique et al. ........ 455/343.1 |
| 2010/0260159 A1* | 10/2010 | Zhang et al. .................. 370/338 |
| 2011/0280232 A1* | 11/2011 | Wu et al. ....................... 370/338 |
| 2012/0213305 A1 | 8/2012 | Oh et al. |
| 2012/0224570 A1 | 9/2012 | Seok et al. |
| 2013/0107912 A1* | 5/2013 | Ponnampalam ............... 375/147 |

FOREIGN PATENT DOCUMENTS

| KR | 1020110036485 A | 4/2011 |
|---|---|---|
| KR | 1020110103357 A | 9/2011 |

* cited by examiner

*Primary Examiner* — Dang Ton
*Assistant Examiner* — Pamit Kaur (57) ABSTRACT

A data transmission apparatus in a communication system includes a verification unit configured to verify a new frequency band for transmitting and receiving data to and from a plurality of terminals; a generation unit configured to generate a frame in the new frequency band; and a transmission unit configured to transmit data through the new frequency band by using the frame, wherein the frame includes data fields in which data corresponding to the terminals are included, and control fields in which control information for receiving the data included in the data field in the terminals is included, and wherein the control fields include a VHT-STF (very high throughput short training field), a VHT-SIG (very high throughput signal field) A1, a VHT-SIG A2, a plurality of VHT-LTFs (very high throughput long training fields), and a VHT-SIG B.

20 Claims, 5 Drawing Sheets

APPARATUS AND METHOD FOR TRANSMITTING/RECEIVING DATA IN COMMUNICATION SYSTEM

CROSS-REFERENCES TO RELATED APPLICATIONS

The present application claims priorities of Korean Patent Application Nos. 10-2011-0104869, 10-2011-0125315, and 10-2012-0113418, filed on Oct. 13, 2011, Nov. 28, 2011, and Oct. 12, 2012, respectively, which are incorporated herein by reference in their entireties.

BACKGROUND OF THE INVENTION

1. Field of the Invention

Exemplary embodiments of the present invention relate to a communication system, and, more particularly, to an apparatus and a method for transmitting and receiving data in a communication system, in which a frame is effectively configured in consideration of wireless transmission in a new frequency band and data are transmitted and received through the configured frame.

2. Description of Related Art

In a current communication system, research for providing various qualities of service (hereinafter, referred to as 'QoS') to users at a high transmission rate has been actively conducted. In a wireless local area network (hereinafter, referred to as 'WLAN') system as an example of such a communication system, research for methods for stably transmitting large data at a high speed through limited resources has been actively conducted. In particular, in a communication system, research for data transmission through wireless channels has been conducted. Recently, methods for the WLAN system to normally transmit and receive large data by effectively using limited wireless channels have been suggested.

Meanwhile, in a current communication system, in order to efficiently transmit larger capacity data, research for a new frequency band different from a frequency band used for data transmission and reception in an existing communication system has been conducted. In particular, research for data transmission and reception in such a new frequency band has been conducted.

However, in the current communication system, no concrete method for transmitting and receiving data in a new frequency band different from an existing frequency band has been suggested. In particular, no concrete method for a frame for transmitting and receiving data in a new frequency band has been suggested.

As a consequence, in order to stably transmit and receive data at a high speed through a new frequency band in a communication system, for example, a WLAN system, methods for configuring a frame in a new frequency band and normally transmitting and receiving data through the frame configured in this way are demanded in the art.

SUMMARY OF THE INVENTION

Embodiments of the present invention are directed to an apparatus and a method for transmitting and receiving data in a communication system.

Other embodiments of the present invention are directed to an apparatus and a method for configuring a frame in a new frequency band and stably transmitting and receiving data at a high speed in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a data transmission apparatus in a communication system includes: a verification unit configured to verify a new frequency band for transmitting and receiving data to and from a plurality of terminals; a generation unit configured to generate a frame in the new frequency band; and a transmission unit configured to transmit data through the new frequency band by using the frame, wherein the frame includes data fields in which data corresponding to the terminals are included, and control fields in which control information for receiving the data included in the data field in the terminals is included, and wherein the control fields include a VHT-STF (very high throughput short training field), a VHT-SIG (very high throughput signal field) A1, a VHT-SIG A2, a plurality of VHT-LTFs (very high throughput long training fields), and a VHT-SIG B.

In accordance with another embodiment of the present invention, a data reception apparatus in a communication system includes: a reception unit configured to receive a frame in a new frequency band for transmitting and receiving data to and from a plurality of terminals, through the new frequency band; a verification unit configured to verify control information included in control fields of the frame; and a recovery unit configured to recover data included in data fields of the frame by using the control information, wherein the control fields include a VHT-STF (very high throughput short training field), a VHT-SIG (very high throughput signal field) A1, a VHT-SIG A2, a plurality of VHT-LTFs (very high throughput long training fields), and a VHT-SIG B.

In accordance with another embodiment of the present invention, a data transmitting method in a communication system includes: verifying a new frequency band for transmitting and receiving data to and from a plurality of terminals; generating a frame in the new frequency band; and transmitting data through the new frequency band by using the frame, wherein the frame includes data fields in which data corresponding to the terminals are included, and control fields in which control information for receiving the data included in the data field in the terminals is included, and wherein the control fields include a VHT-STF (very high throughput short training field), a VHT-SIG (very high throughput signal field) A1, a VHT-SIG A2, a plurality of VHT-LTFs (very high throughput long training fields), and a VHT-SIG B.

In accordance with another embodiment of the present invention, a data receiving method in a communication system includes: receiving a frame in a new frequency band for transmitting and receiving data to and from a plurality of terminals, through the new frequency band; verifying control information included in control fields of the frame; and recovering data included in data fields of the frame by using the control information, wherein the control fields include a VHT-STF (very high throughput short training field), a VHT-SIG (very high throughput signal field) A1, a VHT-SIG A2, a plurality of VHT-LTFs (very high throughput long training fields), and a VHT-SIG B.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention suggests an apparatus and a method for transmitting and receiving data in a communication system, for example, a wireless local area network (hereinafter, referred to as 'WLAN') system. While the WLAN system will be exemplarily described in embodiments of the present invention, the apparatus and the method for transmitting and receiving data suggested in the present invention may be applied to other communication systems.

Embodiments of the present invention suggest an apparatus and a method for transmitting and receiving data in a new frequency band in a communication system, which is different from a frequency band used for transmitting and receiving data in an existing system. In the embodiments of the present invention, a frame in the new frequency band which is different from the frequency band used for transmitting and receiving data in the existing system is configured, and large data are normally transmitted and received through the new frequency band using such a frame. A communication system in accordance with an embodiment of the present invention, for example, a WLAN system uses a wireless communication technology for providing a high speed data service in an unlicensed band. In particular, unlike an existing cellular system, only if an access point (hereinafter, referred to as 'AP') serving as a base station is power-connected with a wired network, the communication system may be easily installed even by any one and data communication may be performed at a low cost. The decentralized operation characteristic of such a WLAN system provides an advantage in that a simple operation is possible, and is extended up to a sensor network and a smart utility network.

Therefore, in an embodiment of the present invention, a scheme for configuring an effective frame in consideration of wireless transmission not in the frequency band used in the existing WLAN system but in a new frequency band is suggested, and large data are normally transmitted and received through the new frequency band by using the frame which is configured through the suggested scheme. In this regard, most systems of WLAN transmission standards which are suggested so far have been developed in such a way as to use multiple antennas or extend a bandwidth so as to improve a transmission speed. Representative examples thereof are the IEEE 802.11n system and the IEEE 802.11ac system. However, while improvement of a transmission speed has a significant meaning in increasing network capacity in a general network environment, coverage expansion has a more significant meaning in a network for information collection, such as a sensor network. In the case where coverage is expanded, since information may be collected over a wide area even with a small number of APs, the sensor network may be constructed with a low cost.

In such a communication system in accordance with the embodiment of the present invention, wireless transmission in the new frequency band means wireless transmission in a frequency band which is different from the 2.4 GHz or 5 GHz band used in the existing WLAN system. Therefore, in the case where the frame structure of the IEEE 802.11ac system is used as it is in the embodiment of the present invention in which wireless transmission is implemented in the new frequency band, data processing rate is likely to deteriorate due to a substantial unnecessary overhead. For example, in the IEEE 802.11ac system, in order to maintain compatibility with the IEEE 802.11a system and the IEEE 802.11n system which are already defined in the same 5 GHz band, additional signals and information are included. However, in the case where the frame structure of the IEEE 802.11ac system is used in the new frequency band in accordance with the embodiment of the present invention, configuration of an efficient frame is possible because additional signals and information are not needed for such compatibility. Further, in the case where a new transmission scheme and a new data transmission rate are defined, bit allocation of control information may be changed.

In the frame structure of the above-described IEEE 802.11ac system, after a legacy short training field (L-STF), a legacy long training field (L-LTF) and a legacy signal field (L-SIG) are first defined in order for compatibility with the IEEE 802.11a system and the IEEE 802.11n system which use the same 5 GHz band, a very high throughput signal field (VHT-SIG) in which the control information of a frame actually used in the IEEE 802.11ac system is included, a very high throughput short training field (VHT-STF) for automatic gain control, a very high throughput long training field (VHT-LTF) for channel estimation, and a data field in which data to be actually transmitted are included, are defined.

The L-STF, L-LTF and L-SIG are fields which are defined for compatibility with the IEEE 802.11a system and the IEEE 802.11n system. Thus, in a system which does not use the 5 GHz band, the fields for the compatibility, that is, the L-STF, L-LTF and L-SIG, serve as unnecessary overheads. Hence, in the embodiment of the present invention, a novel frame structure, which reduces an overhead and includes new control information needed in a new system using a new frequency band, is configured.

The IEEE 802.11ac system enables data transmission of a G bps level while maintaining compatibility with the IEEE 802.11a system and the IEEE 802.11n system in the 5 GHz band. In particular, the IEEE 802.11ac system supports bandwidths of 20 MHz, 40 MHz, 80 MHz and 160 MHz, and transmits maximum 8 data streams using a multiple transmission and reception antenna technology, wherein data are transmitted by configuring a frame to maintain compatibility with other systems as described above. Hereinbelow, a frame structure in a communication system in accordance with an embodiment of the present invention will be described in detail with reference to FIGS. 1 to 3.

Figure 1:
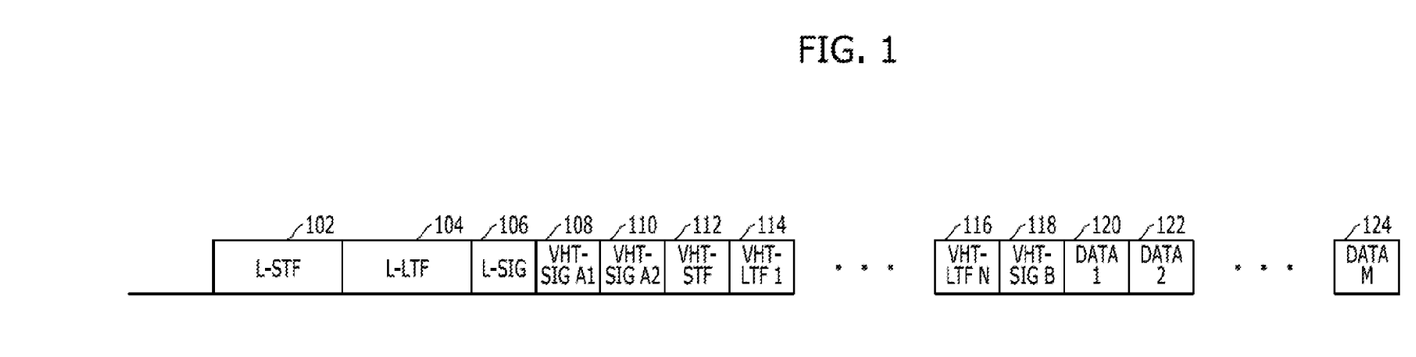
FIGS. 1 to 3 diagrams schematically showing the structures of a frame in a communication system in accordance with embodiments of the present invention.

FIG. 1 is a diagram schematically showing a frame structure in a communication system in accordance with an embodiment of the present invention. FIG. 1 is a diagram schematically showing the frame structure of the IEEE 802.11ac system in the communication system in accordance with the embodiment of the present invention.

Referring to FIG. 1, a frame of the IEEE 802.11ac system includes control fields in which control information for data transmission to and from a plurality of terminals is included, that is, an L-STF 102, an L-LTF 104, an L-SIG 106, a VHT-SIG A1 108, a VHT-SIG A2 110, a VHT-STF 112, a plurality of VHT-LTFs, for example, a VHT-LTF 1 114 and a VHT-LTF N 116, and a VHT-SIG B 118, and includes a plurality of data fields as data fields in which data to be transmitted to the plurality of terminals are included, that is, a DATA 1 120, a DATA 2 122 and a DATA M 124.

The L-STF 102 is used in signal detection, automatic gain control, frequency error estimation, frame synchronization, and so forth, and the L-LTF 104 is used in channel estimation, frequency error estimation, and so forth. Also, the L-SIG 106 includes transmission rate information, frame length information, and so forth, and the VHT-SIG A1 108 and the VHT-SIG A2 110 include information such as band widths, guard interval lengths, space-time codes, transmission rates (MCS (modulation and coding scheme) levels), data stream numbers, AID information, a used coding technology, beamforming, and so forth.

The VHT-STF 112 is used in automatic gain control, and the VHT-LTF 1 114 and the VHT-LTF N 116 are used in channel estimation. The VHT-SIG B 118 includes transmission rates (MCS levels) by user, for multi-user MIMO (multi-input multi-output), data length information, and so forth, and the DATA 1 120, the DATA 2 122 and the DATA M 124 include data which are to be actually transmitted to users, that is, STAs (stations) as terminals.

The VHT-LTF 1 114 and the VHT-LTF N 116 are determined according to the number of data streams which are to be transmitted through the frame. For example, in the case where only one stream is transmitted, only the VHT-LTF 1 114, that is, one VHT-LTF is included in the frame, and, in the case where the number of streams is 2, the VHT-LTF 1 114 and a VHT-LTF 2, that is, two VHT-LTFs are included in the frame.

The transmission rate information and frame length information of the L-SIG 106 do not actually include the information of data, and causes data transmission not to be implemented during the length of a received frame in the case where the terminals of the IEEE 802.11a system or the IEEE 802.11n system receive the corresponding frame. The transmission rate information and frame length information of the L-SIG 106 become unnecessary information in the case where compatibility with the IEEE 802.11a system or the IEEE 802.11n system is not considered. The functions of the L-STF 102 and the L-LTF 104 may be replaced by the VHT-STF 112 and the VHT-LTFs 114 and 116. In the case where compatibility is not considered as described above, the frame structure of the IEEE 802.11ac system becomes an inefficient frame structure due to the presence of an overhead. A frame structure newly configured by removing such inefficiency will be described in detail with reference to FIG. 2.

Figure 2:
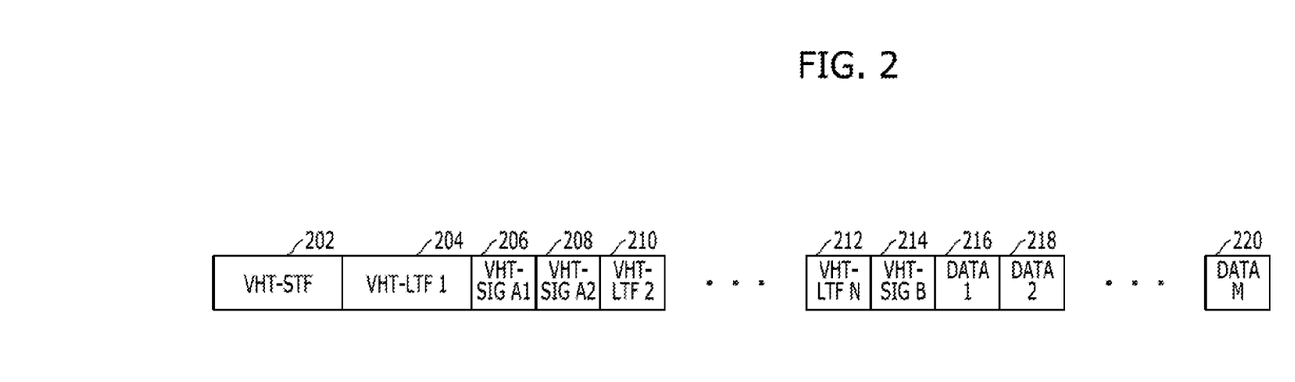

FIG. 2 is a diagram schematically showing a frame structure in a communication system in accordance with another embodiment of the present invention. FIG. 2 is a diagram showing a frame structure in which compatibility with the IEEE 802.11a system or the IEEE 802.11n system is not considered and an overhead is reduced from the frame structure of the IEEE 802.11ac system shown in FIG. 1, to improve efficiency. Also, FIG. 2 is a diagram showing a new frame structure in a new frequency band in a communication system in accordance with another embodiment of the present invention, which is different from a frequency band used for transmitting and receiving data in an existing system.

Referring to FIG. 2, a frame in the new frequency band includes control fields in which control information for data transmission to and from a plurality of terminals is included, that is, a VHT-STF 202, a VHT-SIG A1 206, a VHT-SIG A2 208, a plurality of VHT-LTFs, for example, a VHT-LTF 1 204, a VHT-LTF 2 210 and a VHT-LTF N 212, and a VHT-SIG B 214, and includes a plurality of data fields as data fields in which data to be transmitted to the plurality of terminals are included, that is, a DATA 1 216, a DATA 2 218 and a DATA M 220.

The VHT-STF 202 is used in signal detection, automatic gain control, frequency error estimation, frame synchronization, and so forth, and the VHT-LTF 1 204 is used in channel estimation, frequency error estimation, and so forth. Also, the VHT-SIG A1 206 and the VHT-SIG A2 208 include information such as band widths, guard interval lengths, space-time codes, transmission rates (MCS levels), data stream numbers, AID information, a used coding technology, beamforming, application of a new transmission mode, and so forth.

Not only the VHT-LTF 1 204 but also the VHT-LTF 2 210 and the VHT-LTF N 212 are used in channel estimation, and the VHT-SIG B 214 includes transmission rates (MCS levels) by user, for multi-user MIMO, data length information, and so forth. The DATA 1 216, the DATA 2 218 and the DATA M 220 include data which are to be actually transmitted to users, that is, STAs as terminals.

In the communication system in accordance with the embodiment of the present invention, in order to transmit data using the frame in the new frequency band, the VHT-STF 202 is extended by the length of the L-STF 102 in the above-described frame of the IEEE 802.11ac system, and performs the function performed by the L-STF 102. Among the VHT-LTFs 204, 210 and 212, the VHT-LTF 1 204 as a first long training field is preferentially arranged at the front portion of the frame, that is, next to the VHT-STF 202, and the remaining N−1 number of VHT-LTFs 210 and 212 are arranged after the VHT-SIG A1 206 and the VHT-SIG A2 208. Control information for the frame which all terminals should receive is included in the VHT-SIG A1 206 and the VHT-SIG A2 208.

In the case where the communication system, which transmits and receives data using such frame in the new frequency band, supports a multi-user MIMO function, the VHT-SIG B 214, which includes the transmission rate information by user and the data length information, should be included in the frame structure in the new frequency band. In the case where the communication system does not support the multi-user MIMO function, the VHT-SIG B 214 may be omitted from the frame.

The structures of the VHT-SIG A1 206 and the VHT-SIG A2 208 are as given in Table 1.

TABLE 1

| | | | | |
|---|---|---|---|---|
| VHT-SIG A1 | B0-B1 | Bandwidth | 2-bit | Denoting 20/40/80/160 MHz by 0/1/2/3, respectively. |
| | B3 | Reservation | 1-bit | Fixing to 1 |
| | B4-B9 | Group ID | 6-bit | Including group ID information |
| | B10- | Nsts | 12- | In the case of a multi- |

TABLE 1-continued

| | | | bit | user, denoting the numbers of streams of 4 users to 0 to 4, by 3 bits for each user In the case of a single user, denoting 1(000) to 8(111) streams by B10 to B12, B13 to B21 including partial AID information |
|---|---|---|---|---|
| | B22 | TXOP_PS_NOT_ALLOWED | 1-bit | Indicating whether TXOP_PS can be utilized or not |
| | B23 | Reservation | 1-bit | Fixing to 1 |
| VHT-SIG A2 | B0-B1 | Short GI | 2-bit | Setting according to whether short GI is used or not |
| | B2-B3 | Coding scheme (coding) | 2-bit | Indicating whether LDPC and BCC are used or not |
| | B4-B7 | Transmission rate (MCS) | 4-bit | Defining 10 MCSs from BPSK 1/2 code rate to 256-QAM 5/6 code rate |
| | B8 | Beamforming | 1-bit | Indicating whether beamforming is used or not |
| | B9 | Reservation | 1-bit | Fixing to 1 |
| | B10-B17 | CRC | 8-bit | Inserting CRC bit |
| | B18-B23 | Tail | 6-bit | For tailing trellis of Viterbi decoder |

In Table 1, in the case where the number of possible bandwidths (BWs) of the communication system in accordance with the embodiment of the present invention as shown in FIG. 2, which uses the frame structure in the new frequency band, is at least 4, the region B3 of the VHT-SIG A1 206 may be additionally utilized for bandwidth information in consideration of the cases where a bandwidth is equal to or larger than 20 MHz, 40 MHz, 80 MHz and 160 MHz, for example. In the case of Nsts which denotes the number of space-time transmission streams in the VHT-SIG A1 206, maximum 4 streams are allocated to 4 users for a multi-user, and, in the case of a single user, maximum 8 streams may be allocated. In the communication system in accordance with the embodiment of the present invention as shown in FIG. 2, which uses the frame structure in the new frequency band, as can be readily seen from above descriptions, each of the numbers of streams to be allocated is decreased to a half to secure a margin of 1 bit, and the 1 bit secured in this way may be allocated to a new transmission scheme.

That is to say, in the communication system in accordance with the embodiment of the present invention as shown in FIG. 2, which uses the frame structure in the new frequency band, a transmission rate is decreased to a half through repetitive transmission and the like when compared to a conventional system, and 1 bit may be allocated to define a mode capable of increasing a communication distance.

Therefore, in the communication system in accordance with the embodiment of the present invention, 3 bits are allocated to each user in the case of a multi-user, wherein 1 bit of the 3 bits is allocated as a bit for indicating whether or not to perform repetitive transmission, and the remaining 2 bits denote the number of transmission streams. Furthermore, in the communication system in accordance with the embodiment of the present invention, even in the case of a single user, 1 bit is used to indicate whether or not to perform repetitive transmission, the remaining 2 bits define 1 to 4 transmission streams, and, in the case where an additional transmission mode is further needed, the additional transmission mode may be used by using other reserved bits.

For example, in the communication system in accordance with the embodiment of the present invention, in the case where up to a 4× repetitive transmission mode or a 6× repetitive transmission mode is defined to further extend a communication distance, up to the region B23 of the VHT-SIG A1 206 or the region B9 of the VHT-SIG A2 208 is utilized in defining a new mode. Moreover, in the communication system in accordance with the embodiment of the present invention, in the case where a mode for extending a communication distance by increasing a reception sensitivity as in repetitive transmission is used, the VHT-STF 202 and the VHT-LTFs 204, 210 and 212 are used by being extended in the lengths thereof to improve performance of initial signal detection and channel estimation. The extended VHT-LTFs 204, 210 and 212 have the same structure as an existing OFDM (orthogonal frequency division multiplexing) symbol. In the case where the VHT-LTFs 204, 210 and 212 are not extended, they have the structure of DGI (double GI (guard interval))+LTF+LTF as in the L-LTF 104, and, in the case where the VHT-LTFs 204, 210 and 212 are extended, extension is made by increasing the number of the structures of GI+LTF which are added next to the structure of DGI+LTF+LTF.

For the sake of convenience in explanation, it is assumed that, in the basic structures of the VHT-SIG A1 206 and the VHT-SIG A2 208, 52 data subcarriers, which remain by excluding guard band, DC (direct current) and pilot subcarriers from total 64 subcarriers, are used as BPSK (binary phase shift keying) ½ coding rate channel codes. According to this fact, in the communication system in accordance with the embodiment of the present invention, while 26 bits may be allocated to each OFDM symbol, only 24 bits may be allocated to each OFDM symbol by using only 48 data subcarriers as in the L-SIG 106 of the IEEE 802.11ac system.

For example, in the communication system in accordance with the embodiment of the present invention, as in the IEEE 802.11ac system, a W Hz bandwidth mode using 64 subcarriers, a 2 W Hz bandwidth mode using 128 subcarriers, a 4 W Hz bandwidth mode using 256 subcarriers and an 8 W Hz bandwidth mode using 512 subcarriers are basically present, and a W/2 Hz bandwidth mode using 32 subcarriers is additionally present. In this regard, while W=20 MHz is defined in the IEEE 802.11ac system, in the communication system in accordance with the embodiment of the present invention, a bandwidth is used by being changed so as to use a new frequency band different from that of the IEEE 802.11ac system. The bandwidth in the new frequency band is defined as W Hz.

In other words, in the communication system in accordance with the embodiment of the present invention, the VHT-SIG A1 206 and the VHT-SIG A2 208 for the W/2 bandwidth mode and the VHT-SIG A1 206 and the VHT-SIG A2 208 for the W Hz, 2 W Hz, 4 W Hz and 16 W Hz bandwidth modes are separately defined. In the communication system in accordance with the embodiment of the present invention, since the W Hz, 2 W Hz, 4 W Hz and 16 W Hz bandwidth modes are defined by defining the W Hz bandwidth mode using 64 subcarriers and then extending the W Hz bandwidth mode, the total numbers of the bits included in the VHT-SIG A1 206 and the VHT-SIG A2 208 are the same with each other. Therefore, in the communication system in accordance with the embodiment of the present invention, in the case of allocating two OFDM symbols to the VHT-SIG A1 206 and the VHT-SIG A2 208, total 52 bits or 48 bits are used to allocate control information.

Figure 4:
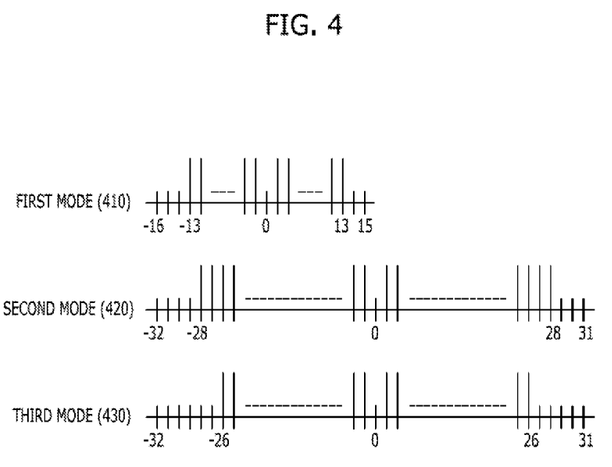
FIG. 4 is a diagram schematically showing subcarrier allocation in a communication system in accordance with an embodiment of the present invention.

Also, in the communication system in accordance with the embodiment of the present invention, because subcarriers capable of being used in the W/2 Hz bandwidth mode are decreased to ½, the number of bits capable of being allocated to each OFDM symbol is limited. Namely, in the communication system in accordance with the embodiment of the present invention, as shown in FIG. 4, subcarriers are allocated according to the W Hz bandwidth mode using 64 subcarriers and the W/2 Hz bandwidth mode using 32 subcarriers. Since FIG. 4 will be described later in detail, concrete descriptions thereof will be omitted herein.

That is to say, in the communication system in accordance with the embodiment of the present invention, since a difference in the numbers of information bits capable of being allocated to the VHT-SIG A1 206 and the VHT-SIG A2 208 according to bandwidths is substantial, the OFDM symbol numbers and bit allocation schemes of the VHT-SIG A1 206 and the VHT-SIG A2 208 are made different according to bandwidths.

In detail, first, in the case of the W Hz bandwidth mode, in the communication system in accordance with the embodiment of the present invention, when assuming that two OFDM symbols are used as the VHT-SIG A1 206 and the VHT-SIG A2 208, bit allocation for the 48 bits or 52 bits of the VHT-SIG A1 206 and the VHT-SIG A2 208, that is, the information included in the VHT-SIG A1 206 and the VHT-SIG A2 208, is as follows.

MCS (modulation and coding scheme): 4 bits are needed (maximum 16 cases including 10 cases of the IEEE 802.11ac system and new MCSs, in which repetitive transmission is applied to a lowest transmission rate, are denoted).

Length (packet length): At least 10 bits are needed as the length is denoted by the unit of byte (denoted in a 2 byte or 4 byte type) or by the unit of OFDM symbol (an additional bit for solving the ambiguity of the last OFDM symbol is included). Here, 12 bits are needed in the case of the IEEE 802.11a system, 16 bits are needed in the case of the IEEE 802.11n system, and 17 bits are needed in the case of the IEEE 802.11ac system.

Guard interval (guard interval length): 2, 3 or 4 types are included in a regular GI type, a short GI type, and, as the occasion demands, a shorter GI type, and 1 bit or 2 bits are needed.

BW (bandwidth): 2 bits for denoting the W Hz, 2 W Hz, 4 W Hz and 8 W Hz bandwidth modes and 1 bit for denoting the W/2 Hz bandwidth mode are added. In the case of the W/2 Hz bandwidth mode, 1 bit may not be included in BW information for automatic detection using a preamble. 2 to 3 bits are needed.

STBC (space-time block code): 1 bit is needed to indicate whether STBCs are utilized or not.

Tail: 6 bits of 0 are inserted last.

Nsts (number of space-time streams): Maximum 4 as the number of data streams to be simultaneously transmitted using MIMO may be denoted, and 2 bits are needed.

Coding scheme: 1 bit is needed to select a convolution code and a low density parity check (LDPC) code.

TXOP-PS (power save using TXOP (transmission opportunity)): 1 bit is needed to denote selection according to whether TXOP-PS is utilized or not.

CRC: 8 bits are needed to perform CRC (cyclic redundancy check) for the VHT-SIG A1 206 and the VHT-SIG A2 208 (the number of bits may be changed through change of the coding rate of the CRC).

Reserved (reserved bit): Bits left after allocation are denoted by preset numbers at preset locations.

Further, in the communication system in accordance with the embodiment of the present invention, the contents used in the IEEE 802.11 system may be changed and other contents may be added. The following information is additionally included. That is to say, the information additionally included in the VHT-SIG A1 206 and the VHT-SIG A2 208 is as follows.

Application field and QoS (quality of service) requirements.

Aggregation.

Battery power warning.

Power level.

PSMP (power save multi-poll) group.

Warning signals.

A number of parameters associated with STA connection.

In other words, in the communication system in accordance with the embodiment of the present invention, the VHT-SIG A1 206 and the VHT-SIG A2 208 constituted by 48 bits or 52 bits by combining bits as described above are transmitted during 2 OFDM symbols.

Moreover, in the W/2 Hz bandwidth mode, since total 24 bit allocation is possible in the case where only 2 OFDM symbols are allocated to the VHT-SIG A1 206 and the VHT-SIG A2 208, in the communication system in accordance with the embodiment of the present invention, only essential information is allocated as follows. That is to say, the essential information included in the VHT-SIG A1 206 and the VHT-SIG A2 208 is as follows.

MCS: 4 bits.

Length: 12 bits.

Tail: 6 bits.

Parity: 1 bit (error check is performed using parity, instead of CRC)

W/2 Hz BW (or GI): 1 bit. 1 bit may be allocated to identify the W/2 Hz bandwidth mode. Since automatic detection may be implemented using a preamble structure, a guard interval length is denoted instead.

In this way, in the communication system in accordance with the embodiment of the present invention, since only the essential information of 24 bits is allocated to the VHT-SIG A1 206 and the VHT-SIG A2 208, the number of OFDM symbols is increased to 3 or 4 in the case where information is additionally needed, so that the needed information is additionally allocated as in the W Hz bandwidth mode. Further, in the communication system in accordance with the embodiment of the present invention, in the case of the W/2 Hz bandwidth mode, the lengths of the VHT-SIG A1 206 and the VHT-SIG A2 208 may be made different from packet to packet, such that the amounts of the information included in the VHT-SIG A1 206 and the VHT-SIG A2 208 are made different from each other. In this regard, in order for a reception apparatus to verify the differences in the lengths of the VHT-SIG A1 206 and the VHT-SIG A2 208 and verify the extension of the VHT-LTFs 204, 210 and 212 in the case of using repetitive transmission, the VHT-SIG A1 206 and the VHT-SIG A2 208 are modified by combining Q-BPSK and BPSK and are then transmitted. According to this fact, the reception apparatus first discriminates the W/2 Hz bandwidth mode and the W Hz, 2 W Hz, 4 W Hz and 8 W Hz bandwidth modes from each other, verifies the VHT-SIG A1 206 and the VHT-SIG A2 208 in such a way as to correspond to such discrimination, detects the numbers of OFDM symbols used in the VHT-SIG A1 206 and the VHT-SIG A2 208 even in case of the W/2 Hz bandwidth mode, and extracts the information included in the VHT-SIG A1 206 and the VHT-SIG A2 208. Hereinbelow, a new frame structure in which a repetitive transmission scheme is considered in a communication system in accordance with an embodiment of the present invention will be described in detail with reference to FIG. 3.

Figure 3:
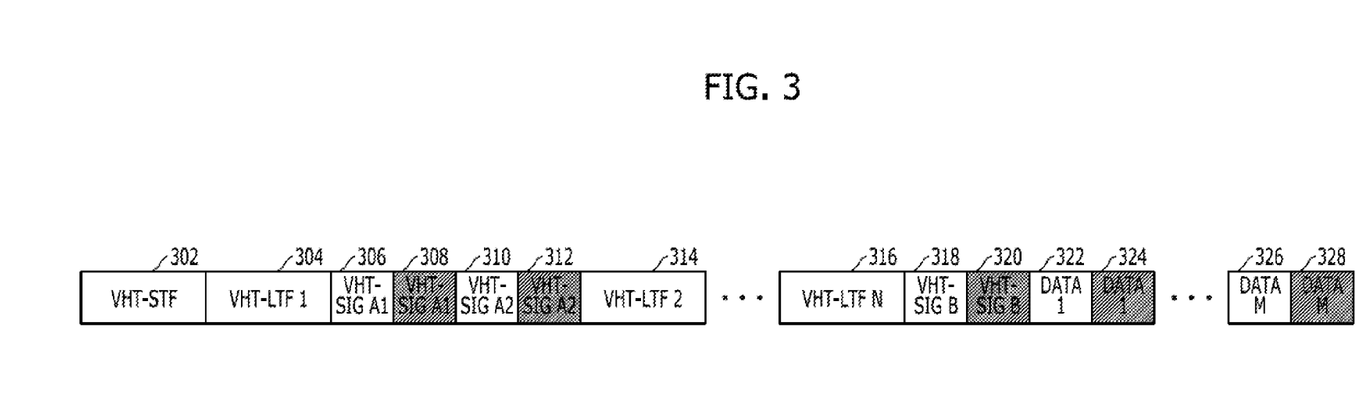

FIG. 3 is a diagram schematically showing a frame structure in a communication system in accordance with still another embodiment of the present invention. FIG. 3 is a diagram showing a new frame structure in which a repetitive transmission scheme is considered in the new frame structure for the new frequency band, shown in FIG. 2. Also, FIG. 3 is a diagram showing a new frame structure in which each of a VHT-SIG A1 and a VHT-SIG A2 includes 2 OFDM symbols and a 2× repetitive transmission scheme is exemplified.

Referring to FIG. 3, a frame in the new frequency band includes control fields in which control information for data transmission to and from a plurality of terminals is included, that is, a VHT-STF 302, two VHT-SIG A1s 306 and 308, two VHT-SIG A2s 310 and 312, a plurality of VHT-LTFs, that is, a VHT-LTF 1 304, a VHT-LTF 2 314 and a VHT-LTF N 316, and two VHT-SIG Bs 318 and 320 according to repetitive transmission, and includes a plurality of data fields as data fields in which data to be transmitted to the plurality of terminals are included, that is, two DATA 1s 322 and 324 and two DATA Ms 326 and 328.

The VHT-STF 302 is used in signal detection, automatic gain control, frequency error estimation, frame synchronization, and so forth, and the VHT-LTF 1 304 is used in channel estimation, frequency error estimation, and so forth. Also, the VHT-SIG A1s 306 and 308 and the VHT-SIG A2s 310 and 312 include information such as band widths, guard interval lengths, space-time codes, transmission rates (MCS levels), data stream numbers, AID information, a used coding technology, beamforming, and so forth.

Not only the VHT-LTF 1 304 but also the VHT-LTF 2 314 and the VHT-LTF N 316 are used in channel estimation, and the VHT-SIG Bs 318 and 320 include transmission rates (MCS levels) by user, for multi-user MIMO, data length information, and so forth. The DATA is 322 and 324 and the DATA Ms 326 and 328 include data which are to be actually transmitted to users, that is, STAs as terminals.

In the communication system in accordance with the embodiment of the present invention, in the case where a repetitive transmission scheme is considered, that is, a repetitive transmission mode is used, in the frame structure in the new frequency band shown in FIG. 2, not only a VHT-SIG A1 and a VHT-SIG A2 but also a VHT-SIG B repeat their respective previous symbols, that is, are consecutively repeated as in the frame structure shown in FIG. 3 and thus the two VHT-SIG A1s 306 and 308, the two VHT-SIG A2s 310 and 312 and the two VHT-SIG Bs 318 and 320 are included in the frame, and also, the data fields repeat their respective previous symbols, that is, are consecutively repeated and thus the two DATA 1s 322 and 324 and the two DATA Ms 326 and 328 are included in the frame. The consecutively repeated VHT-SIG A1s 306 and 308, VHT-SIG A2s 310 and 312, VHT-SIG Bs 318 and 320, DATA 1s 322 and 324 and DATA Ms 326 and 328 have the types of symbols which repeat their respective previous symbols, and are included in the frame through a variety of repetition schemes such as simple symbol repetition or repetition by changing the positions of subcarriers.

In the communication system in accordance with the embodiment of the present invention which uses the frame structure shown in FIG. 3, as reception sensitivity is improved, the length of the VHT-STF 302 is extended and thus signal detection performance in the reception apparatus is improved, and the lengths of the VHT-LTF2 314 and the VHT-LTF N 316 are extended as well. Namely, as aforementioned above with reference to FIG. 2, the VHT-STF 302 is extended by the length of the L-STF 102 in the above-described frame of the IEEE 802.11ac system, and performs the function performed by the L-STF 102. Among the VHT-LTFs 304, 314 and 316, the VHT-LTF 1 304 as a first long training field is preferentially arranged at the front portion of the frame, that is, next to the VHT-STF 302, and the remaining N−1 number of VHT-LTFs 314 and 316 are arranged after the VHT-SIG A1s 306 and 308 and the VHT-SIG A2s 310 and 312. Hereinbelow, subcarrier allocation according to bandwidth modes in a communication system in accordance with an embodiment of the present invention will be described in detail with reference to FIG. 4.

FIG. 4 is a diagram schematically showing subcarrier allocation in a communication system in accordance with an embodiment of the present invention. FIG. 4 is a diagram exemplarily showing subcarrier allocation of OFDM symbols to a VHT-SIG A1 and a VHT-SIG A2 in the case of a W Hz bandwidth mode in which 64 subcarriers are used and a W/2 Hz bandwidth mode in which 32 subcarriers are used, in a communication system in accordance with an embodiment of the present invention.

Referring to FIG. 4, a communication system allocates the subcarriers of OFDM symbols to a VHT-SIG A1 and a VHT-SIG A2 in a W/2 Hz bandwidth mode with 32 subcarriers and a W Hz bandwidth mode with 64 subcarriers, as a first mode 410. In the case of the W/2 Hz bandwidth mode, both the case in which the number of data subcarriers is 52, as a second mode 420, and the case in which the number of data subcarriers is 48, as a third mode 430, are considered.

In the W/2 Hz bandwidth mode with 32 subcarriers as the first mode 410, the number of data subcarriers is 24 and the number of pilot subcarriers is 2. In the W Hz bandwidth mode with 64 subcarriers as the second mode 420, the number of data subcarriers is 52 and the number of pilot subcarriers is 4. In the W Hz bandwidth mode with 64 subcarriers as the third mode 430, the number of data subcarriers is 48 and the number of pilot subcarriers is 4. Because the allocation of the subcarriers of the OFDM symbols to the VHT-SIG A1 and the VHT-SIG A2 in the W/2 Hz bandwidth mode and the W Hz bandwidth mode, that is, bit allocation according to the information included in the VHT-SIG A1 and the VHT-SIG A2, was described above in detail, concrete descriptions thereof will be omitted herein.

In this way, in the communication system in accordance with the embodiment of the present invention, a frame structure in a new frequency band, which adopts the transmission frame structure of the IEEE 802.11ac system and which may not consider compatibility with the IEEE 802.11a system and the IEEE 802.11n system, is generated, and an overhead for compatibility with other systems is reduced. Further, the frame is configured by correcting control information in contrast to the addition of a new transmission mode, and the IEEE 802.11ac system may be effectively applied to a new system by being slightly corrected in the standards thereof. Hereinbelow, a data transmission apparatus in a communication system in accordance with an embodiment of the present invention will be described in detail with reference to FIG. 5.

Figure 5:
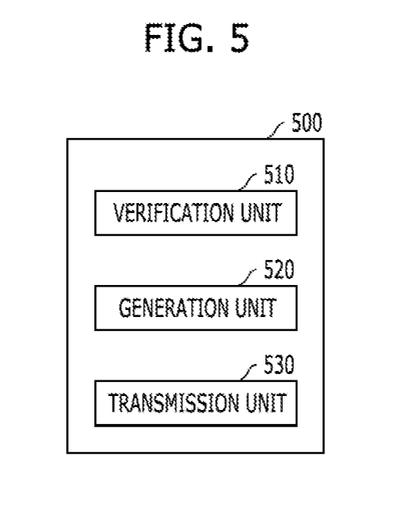
FIG. 5 is a diagram schematically showing the structure of a data transmission apparatus in a communication system in accordance with an embodiment of the present invention.

FIG. 5 is a diagram schematically showing the structure of a data transmission apparatus in a communication system in accordance with an embodiment of the present invention.

Referring to FIG. 5, a data transmission apparatus 500 includes a verification unit 510 configured to verify a new frequency band which is different from a frequency band used for transmitting and receiving data in an existing system, a generation unit 520 configured to generate a new frame for transmitting and receiving data through the new frequency band, and a transmission unit 530 configured to transmit the new frame through the new frequency band, that is, transmit data to terminals by using the new frame.

As described above, the verification unit 510 verifies the new frequency band which is different from a frequency band used for transmitting and receiving data in the existing WLAN system, for example, the IEEE 802.11n system and the IEEE 802.11ac system.

The generation unit 520 generates the new frame for transmitting and receiving data through the new frequency band. Since the new frame in the new frequency band was described above in detail, concrete descriptions thereof will be omitted herein.

The transmission unit 530 transmits the new frame through the new frequency band, that is, transmit the data to the terminals by using the new frame. The data are transmitted by being included in the data field of the new frame as described above. Hereinbelow, data transmitting operations in a communication system in accordance with an embodiment of the present invention will be described in detail with reference to FIG. 6.

Figure 6:
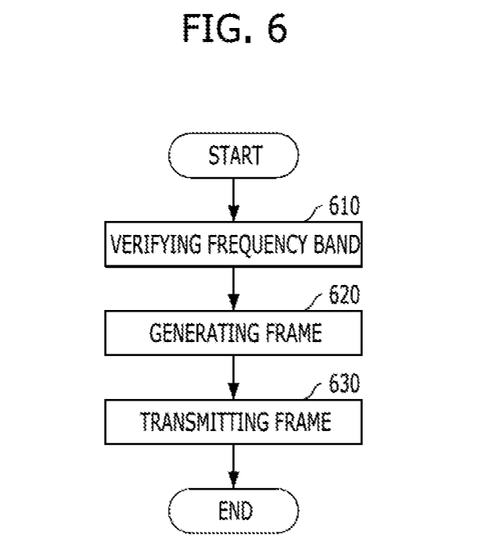
FIG. 6 is a diagram schematically showing a data transmitting procedure in the data transmission apparatus in a communication system in accordance with an embodiment of the present invention.

FIG. 6 is a diagram schematically showing a data transmitting procedure in the data transmission apparatus in a communication system in accordance with an embodiment of the present invention.

Referring to FIG. 6, at step 610, the data transmission apparatus verifies a new frequency band which is different from a frequency band used for transmitting and receiving data in the existing WLAN system, for example, the IEEE 802.11n system and the IEEE 802.11ac system.

At step 620, a new frame for transmitting and receiving data through the new frequency band is generated. Since the new frame in the new frequency band was described above in detail, concrete descriptions thereof will be omitted herein.

Next, at step 630, the new frame is transmitted through the new frequency band, that is, data are transmitted to data reception apparatuses, for example, terminals, by using the new frame. The data are transmitted by being included in the data field of the new frame as described above. Hereinbelow, a data reception apparatus in a communication system in accordance with an embodiment of the present invention will be described in detail with reference to FIG. 7.

Figure 7:
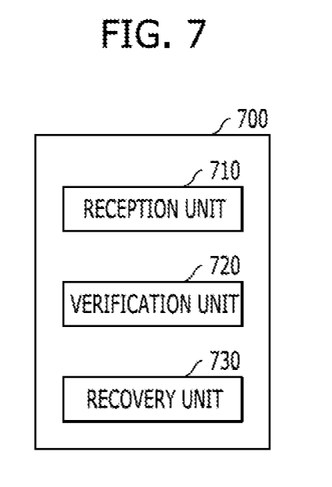
FIG. 7 is a diagram schematically showing the structure of a data reception apparatus in a communication system in accordance with an embodiment of the present invention.

FIG. 7 is a diagram schematically showing the structure of a data reception apparatus in a communication system in accordance with an embodiment of the present invention.

Referring to FIG. 7, a data reception apparatus 700 includes a reception unit 710 configured to receive a new frame from the data transmission apparatus, for example, an AP, through a new frequency band which is different from a frequency band used for transmitting and receiving data in an existing system, a verification unit 720 configured to verify the fields of the frame received through the new frequency band, and a recovery unit 730 configured to recover the data included in the data field of the new frame by using the control information included in the control field of the new frame.

As described above, the reception unit 710 receives the new frame through the new frequency band which is different from a frequency band used for transmitting and receiving data in the existing WLAN system, for example, the IEEE 802.11n system and the IEEE 802.11ac system. Since the new frame in the new frequency band was described above in detail, concrete descriptions thereof will be omitted herein.

The verification unit 720 verifies the fields of the new frame received through the new frequency band, and, in particular, verifies the control information included in the control field of the new frame.

The recovery unit 730 recovers the data included in the data field of the new frame, in particular, the data corresponding to the terminal of itself, by using the control information included in the control field of the new frame. A corresponding service is provided to a user through such data recovery. Hereinbelow, data receiving operations in a communication system in accordance with an embodiment of the present invention will be described in detail with reference to FIG. 8.

Figure 8:
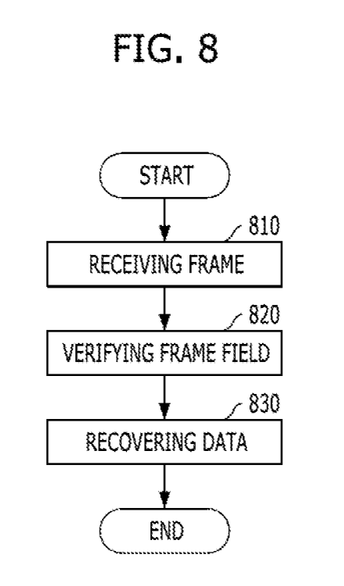
FIG. 8 is a diagram schematically showing a data receiving procedure in the data reception apparatus in a communication system in accordance with an embodiment of the present invention.

FIG. 8 is a diagram schematically showing a data receiving procedure in the data reception apparatus in a communication system in accordance with an embodiment of the present invention.

Referring to FIG. 8, at step 810, the data reception apparatus receives a new frame through a new frequency band which is different from a frequency band used for transmitting and receiving data in the existing WLAN system, for example, the IEEE 802.11n system and the IEEE 802.11ac system. Since the new frame in the new frequency band was described above in detail, concrete descriptions thereof will be omitted herein.

At step 820, the fields of the new frame received through the new frequency band are verified, and, in particular, the control information included in the control field of the new frame is verified.

Next, at step 830, the data included in the data field of the new frame, in particular, the data corresponding to a terminal itself, are recovered by using the control information included in the control field of the new frame. A corresponding service is provided to a user through such data recovery.

As is apparent from the above descriptions, in the communication system in accordance with the embodiments of the present invention, in order to transmit and receive data through a new frequency band which is different from a frequency band used for transmitting and receiving data in the existing WLAN system, for example, the IEEE 802.11n system and the IEEE 802.11ac system, a frame in the new frequency band is effectively generated, and large data are transmitted and received at a high speed through the new frequency band by using the frame generated in this way.

In the embodiments of the present invention, by effectively configuring the frame in the new frequency band which is different from a frequency band used for transmitting and receiving data in an existing system in the communication system, data throughput may be improved and data error rate may be decreased. Furthermore, large data may be stably transmitted and received through the new frequency band.

While the present invention has been described with respect to the specific embodiments, it will be apparent to those skilled in the art that various changes and modifications may be made without departing from the spirit and scope of the invention as defined in the following claims.

What is claimed is:

1. A data transmission apparatus in a communication system, comprising:
  a verification unit configured to verify a frequency band for transmitting and receiving data packets to and from a plurality of terminals;
  a generation unit configured to generate a frame for transmission in the frequency band; and
  a transmission unit configured to transmit data through the frequency band by using the frame,
  wherein the frame includes data fields in which data corresponding to the terminals are included, and control fields in which control information for receiving the data included in the data field in the terminals is included,
  wherein the control fields include a VHT-STF (very high throughput short training field), a VHT-SIG (very high throughput signal field) A1, a VHT-SIG A2, a plurality of VHT-LTFs (very high throughput long training fields), and a VHT-SIG B, wherein the VHT-SIG A1 and the VHT-SIG A2 include information for bandwidth modes corresponding to the frequency band, wherein the bandwidth modes include a W/2 Hz bandwidth mode, a W Hz bandwidth mode, 2 W Hz bandwidth mode, a 4 W Hz bandwidth mode, a 8 W Hz bandwidth mode, and a 16 W Hz bandwidth mode, wherein the W is defined as a bandwidth in the frequency band, wherein symbol numbers and bit allocation schemes of the VHT-SIG A1 and the VHT-SIG A2 are made different according to bandwidths in each of the bandwidth modes, wherein the bandwidth modes are respectively verified by detecting the symbol numbers in the VHT-SIG A1 and the VHT-SIG A2, and wherein lengths of the VHT-SIG A1 and the VHT-SIG A2 are made different from packet to packet in the bandwidth modes.

2. The data transmission apparatus of claim 1, wherein the VHT-STF is extended by a length of an L-STF (legacy short training field), and the plurality of VHT-LTFs are extended by being added with a GI (guard interval) and an LTF.

3. The data transmission apparatus of claim 1, wherein, among the plurality of VHT-LTFs, a first VHT-LTF is arranged next to the VHT-STF, and remaining VHT-LTFs are arranged next to the VHT-SIG A1 and the VHT-SIG A2.

4. The data transmission apparatus of claim 1, wherein the VHT-SIG A1, the VHT-SIG A2, the VHT-SIG B and the data fields repeat their respective previous symbols through a repetition scheme, and serve as the control fields and the data fields by being consecutively repeated through the repetition scheme, wherein the repetition scheme include a symbol repetition or a repetition by changing positions of subcarriers.

5. The data transmission apparatus of claim 1, wherein the VHT-SIG A1 and the VHT-SIG A2 are transmitted through modification in which a Q-BPSK (binary phase shift keying) modification scheme and a BPSK modification scheme are combined.

6. The data transmission apparatus of claim 1, wherein the VHT-STF is used for signal detection, automatic gain control, frequency error estimation and frame synchronization, when transmitting and receiving the data packets through the frequency band.

7. The data transmission apparatus of claim 1, wherein the VHT-LTFs are used for channel estimation and frequency error estimation, when transmitting and receiving the data packets through the frequency band.

8. The data transmission apparatus of claim 1, wherein the VHT-SIG A1 and the VHT-SIG A2 include information regarding band widths, guard interval lengths, space-time codes, transmission rates (MCS (modulation and coding scheme) levels), data stream numbers, AID (association identification) information, a used coding technology, beamforming and application of a transmission mode, when transmitting and receiving the data packets through the frequency band.

9. The data transmission apparatus of claim 1, wherein the VHT-SIG B includes transmission rates (MCS (modulation and coding scheme) levels) by user, for multi-user MIMO (multi-input multi-output), and data length information.

10. A data transmitting method in a communication system, comprising:

verifying a frequency band for transmitting and receiving data packets to and from a plurality of terminals;

generating a frame for transmission in the frequency band; and transmitting data through the frequency band by using the frame, wherein the frame includes data fields in which data corresponding to the terminals are included, and control fields in which control information for receiving the data included in the data field in the terminals is included, wherein the control fields include a VHT-STF (very high throughput short training field), a VHT-SIG (very high throughput signal field) A1, a VHT-SIG A2, a plurality of VHT-LTFs (very high throughput long training fields), and a VHT-SIG B, wherein the VHT-SIG A1 and the VHT-SIG A2 include information for bandwidth modes corresponding to the frequency band, wherein the bandwidth modes include a W/2 Hz bandwidth mode, a W Hz bandwidth mode, 2 W Hz bandwidth mode, a 4 W Hz bandwidth mode, a 8 W Hz bandwidth mode, and a 16 W Hz bandwidth mode, wherein the W is defined as a bandwidth in the frequency band, wherein symbol numbers and bit allocation schemes of the VHT-SIG A1 and the VHT-SIG A2 are made different according to bandwidths in each of the bandwidth modes, wherein the bandwidth modes are respectively verified by detecting the symbol numbers in the VHT-SIG A1 and the VHT-SIG A2, and wherein lengths of the VHT-SIG A1 and the VHT-SIG A2 are made different from packet to packet in the bandwidth modes.

11. The method of claim 10, wherein the VHT-STF is extended by a length of an L-STF (legacy short training field), and the plurality of VHT-LTFs are extended by being added with a GI (guard interval) and an LTF.

12. The method of claim 10, wherein, among the plurality of VHT-LTFs, a first VHT-LTF is arranged next to the VHT-STF, and remaining VHT-LTFs are arranged next to the VHT-SIG A1 and the VHT-SIG A2.

13. The method of claim 10, wherein the VHT-SIG A1, the VHT-SIG A2, the VHT-SIG B and the data fields repeat their respective previous symbols through a repetition scheme, and serve as the control fields and the data fields by being consecutively repeated through the repetition scheme, wherein the repetition scheme include a symbol repetition or a repetition by changing positions of subcarriers.

14. The method of claim 10, wherein the VHT-SIG A1 and the VHT-SIG A2 are transmitted through modification in which a Q-BPSK (binary phase shift keying) modification scheme and a BPSK modification scheme are combined.

15. The method of claim 10, wherein the VHT-STF is used for signal detection, automatic gain control, frequency error estimation and frame synchronization, when transmitting and receiving the data packets through the frequency band.

16. The method of claim 10, wherein the VHT-LTFs are used for channel estimation and frequency error estimation, when transmitting and receiving the data packets through the frequency band.

17. The method of claim 10, wherein the VHT-SIG A1 and the VHT-SIG A2 include information regarding band widths, guard interval lengths, space-time codes, transmission rates (MCS (modulation and coding scheme) levels), data stream numbers, AID (association identification) information, a used coding technology, beamforming and application of a transmission mode, when transmitting and receiving the data packets through the frequency band.

18. The method of claim 10, wherein the VHT-SIG B includes transmission rates (MCS (modulation and coding scheme) levels) by user, for multi-user MIMO (multi-input multi-output), and data length information.

19. A data reception apparatus in a communication system, comprising:
- a reception unit configured to receive a frame in a frequency band for transmitting and receiving data packets to and from a plurality of terminals, through the frequency band;
- a verification unit configured to verify control information included in control fields of the frame; and
- a recovery unit configured to recover data included in data fields of the frame by using the control information,
- wherein the control fields include a VHT-STF (very high throughput short training field), a VHT-SIG (very high throughput signal field) A1, a VHT-SIG A2, a plurality of VHT-LTFs (very high throughput long training fields), and a VHT-SIG B,
- wherein the VHT-SIG A1 and the VHT-SIG A2 include information for bandwidth modes corresponding to the frequency band,
- wherein the bandwidth modes include a W/2 Hz bandwidth mode, a W Hz bandwidth mode, 2 W Hz bandwidth mode, a 4 W Hz bandwidth mode, a 8 W Hz bandwidth mode, and a 16 W Hz bandwidth mode,
- wherein the W is defined as a bandwidth in the frequency band,
- wherein symbol numbers and bit allocation schemes of the VHT-SIG A1 and the VHT-SIG A2 are made different according to bandwidths in each of the bandwidth modes,
- wherein the bandwidth modes are respectively verified by detecting the symbol numbers in the VHT-SIG A1 and the VHT-SIG A2, and
- wherein lengths of the VHT-SIG A1 and the VHT-SIG A2 are made different from packet to packet in the bandwidth modes.

20. A data receiving method in a communication system, comprising:
- receiving a frame in a frequency band for transmitting and receiving data packets to and from a plurality of terminals, through the frequency band;
- verifying control information included in control fields of the frame; and
- recovering data included in data fields of the frame by using the control information,
- wherein the control fields include a VHT-STF (very high throughput short training field), a VHT-SIG (very high throughput signal field) A1, a VHT-SIG A2, a plurality of VHT-LTFs (very high throughput long training fields), and a VHT-SIG B,
- wherein the VHT-SIG A1 and the VHT-SIG A2 include information for bandwidth modes corresponding to the frequency band,
- wherein the bandwidth modes include a W/2 Hz bandwidth mode, a W Hz bandwidth mode, 2 W Hz bandwidth mode, a 4 W Hz bandwidth mode, a 8 W Hz bandwidth mode, and a 16 W Hz bandwidth mode,
- wherein the W is defined as a bandwidth in the frequency band,
- wherein symbol numbers and bit allocation schemes of the VHT-SIG A1 and the VHT-SIG A2 are made different according to bandwidths in each of the bandwidth modes,
- wherein the bandwidth modes are respectively verified by detecting the symbol numbers in the VHT-SIG A1 and the VHT-SIG A2, and
- wherein lengths of the VHT-SIG A1 and the VHT-SIG A2 are made different from packet to packet in the bandwidth modes.

* * * * *